United States Patent
Chung et al.

(10) Patent No.: US 8,630,030 B2
(45) Date of Patent: Jan. 14, 2014

(54) IMAGE FORMING APPARATUS AND IMAGE QUALITY CALIBRATION METHOD THEREOF

(75) Inventors: Woo-jun Chung, Suwon-si (KR);
Hyun-soo Oh, Suwon-si (KR);
Kyeong-man Kim, Yongin-si (KR);
Min-uk Seo, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 985 days.

(21) Appl. No.: 12/686,438

(22) Filed: Jan. 13, 2010

(65) Prior Publication Data
US 2010/0177365 A1    Jul. 15, 2010

(30) Foreign Application Priority Data

Jan. 15, 2009    (KR) .................. 10-2009-0003478

(51) Int. Cl.
*H04N 1/46*    (2006.01)

(52) U.S. Cl.
USPC ............. 358/504; 358/1.9; 358/518; 399/49

(58) Field of Classification Search
USPC .................. 358/504, 1.9, 518; 399/49, 72
See application file for complete search history.

(56) References Cited

U.S. PATENT DOCUMENTS

| | | | | |
|---|---|---|---|---|
| 6,243,542 B1 * | 6/2001 | Fujimoto et al. | ................ | 399/49 |
| 8,035,863 B2 * | 10/2011 | Bisset et al. | ................. | 358/406 |
| 8,189,244 B2 * | 5/2012 | Fukuhara | ....................... | 358/518 |
| 2002/0113984 A1 * | 8/2002 | Nakajima et al. | ............. | 358/1.9 |
| 2005/0075813 A1 * | 4/2005 | Shen | ............................... | 702/85 |
| 2006/0203309 A1 * | 9/2006 | Hirayama | ..................... | 358/504 |
| 2007/0182996 A1 * | 8/2007 | Nakajima | .................... | 358/3.13 |
| 2007/0285743 A1 * | 12/2007 | Hirayama | ..................... | 358/504 |
| 2008/0192272 A1 * | 8/2008 | Yamada | ......................... | 358/1.9 |
| 2010/0020340 A1 * | 1/2010 | Butler | ............................ | 358/1.9 |
| 2010/0027078 A1 * | 2/2010 | Bisset et al. | ................. | 358/406 |
| 2010/0315685 A1 * | 12/2010 | Zaima | ........................... | 358/3.26 |

FOREIGN PATENT DOCUMENTS

| | | | |
|---|---|---|---|
| JP | 8275005 | | 10/1996 |
| JP | 2000175060 | | 6/2000 |
| JP | 2005-059222 | | 3/2005 |
| JP | 2007136951 A | * | 6/2007 |
| JP | 2008009445 | | 1/2008 |

* cited by examiner

*Primary Examiner* — Kimberly A Williams
(74) *Attorney, Agent, or Firm* — Stanzione & Kim, LLP

(57) ABSTRACT

An image forming apparatus and an image quality calibration method in the image forming apparatus, the image forming apparatus including a printing unit to print a calibration chart in one mode selected from a plurality of resolution modes, a scanning unit to scan the printed calibration chart, and a calibrating unit to calibrate an image using color values of the scanned calibration chart according to the plurality of resolution modes.

16 Claims, 6 Drawing Sheets

IMAGE FORMING APPARATUS AND IMAGE QUALITY CALIBRATION METHOD THEREOF

CROSS-REFERENCE TO RELATED APPLICATIONS

This application claims the benefit under 35 U.S.C. §119(a) of Korean Patent Application No. 10-2009-0003478, filed on Jan. 15, 2009, in the Korean Intellectual Property Office, the disclosure of which is incorporated herein by reference in its entirety.

BACKGROUND

1. Field of the Invention

The present general inventive concept relates to an image forming apparatus and an image quality calibration method thereof. More particularly, the present general inventive concept relates to an image forming apparatus capable of calibrating a printing status using a single calibration chart according to a plurality of resolution modes, and to an image quality calibration method thereof.

2. Description of the Related Art

In the current digital age, documents are stored, kept, and transferred as digital documents called files. However, a large number of users still use documents printed by printing devices, such as multifunctional peripherals (MFPs) or large format printers.

In particular, corporations or public institutions print large volumes of documents everyday. For example, insurance companies print a variety of information such as general contract conditions and contract information on clients using printing devices.

As documents printed by printing devices increase, products which are capable of printing fifty thousand sheets of paper using a single consumable, such as toner or developer, have been launched. Using these products, users do not need to frequently replace a currently used consumable, thereby increasing user convenience.

However, in this situation, various problems may occur. For example, the density of colors may change as compared to the initial density of the colors. Additionally, intermediate colors may vary due to the repeated printing process.

Therefore, not only users but also sellers of these high volume printing products desire to maintain constant colors and color depth until the consumable is completely exhausted.

SUMMARY

Example embodiments of the present general inventive concept provide an image forming apparatus capable of calibrating the printing status of a plurality of resolution modes using a single printed calibration chart in order to improve the image quality to maintain the initial printing quality, and to an image quality calibration method performed by the image forming apparatus.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming apparatus with a plurality of resolution modes, the apparatus including a printing unit to print a calibration chart in one mode selected from the plurality of resolution modes, a scanning unit to scan the printed calibration chart, and a calibrating unit to calibrate an image using color values of the scanned calibration chart according to the plurality of resolution modes.

The calibrating unit may calibrate halftone tables which are set to be respectively used in each of the plurality of resolution modes to calibrate the image.

The plurality of resolution modes may include a normal mode, a best mode, and a draft mode.

The apparatus may further include a color value converting unit to convert the color values of the scanned calibration chart into brightness values. The calibrating unit may calibrate the halftone tables set to be respectively used in each of the plurality of resolution modes using the converted brightness values.

The calibrating unit may compare the converted brightness values to preset reference values of the halftone tables set to be respectively used in each of the plurality of resolution modes, may set calibration values, and may apply each of the set calibration values to the halftone tables set to be respectively used in each of the plurality of resolution modes.

The apparatus may further include a user interface unit to receive input of a calibration algorithm execution request signal, and a control unit to control the printing unit to print a test sample in response to the request signal being received via the user interface unit. The user interface unit may receive input of a calibration algorithm re-execution request signal according to a printing status of the printed test sample.

The printing unit may print the test sample using the calibrated halftone tables set to be respectively used in each of the plurality of resolution modes.

The calibration chart may include a chart in which cyan (C), magenta (M), yellow (Y) and black (K) are gradually gradated from their respective original colors to white in 16 grades.

The foregoing and/or other features and utilities of the present general inventive concept may also be achieved by providing an image quality calibration method in an image forming apparatus with a plurality of resolution modes, the method including printing a calibration chart in one mode selected from the plurality of resolution modes, scanning the printed calibration chart, and calibrating an image using color values of the scanned calibration chart according to the plurality of resolution modes.

The calibrating of the image may include calibrating halftone tables which are set to be respectively used in each of the plurality of resolution modes to calibrate the image.

The plurality of resolution modes may include a normal mode, a best mode, and a draft mode.

The method may further include converting the color values of the scanned calibration chart into brightness values. The calibrating of the image may include calibrating the halftone tables set to be respectively used in each of the plurality of resolution modes using the converted brightness values.

The calibrating of the image may include comparing the converted brightness values to preset reference values of the halftone table set to be respectively used in each of the plurality of resolution modes, setting calibration values, and applying each of the set calibration values to the halftone table sets to be respectively used in each of the plurality of resolution modes.

The method may further include receiving input of a calibration algorithm execution request signal, printing a test sample in response to the request signal being received via the user interface unit, and receiving input of a calibration algorithm re-execution request signal according to a printing status of the printed test sample.

The method may further include printing the test sample using the calibrated halftone tables set to be respectively used in each of the plurality of resolution modes.

The calibration chart may include a chart in which cyan (C), magenta (M), yellow (Y) and black (K) are gradually gradated from their respective original colors to white in 16 grades.

The foregoing and/or other features and utilities of the present general inventive concept may also be achieved by providing an image forming apparatus including a scanning unit to scan a calibration chart, and a calibrating unit to calibrate color printing values according to the scanned calibration chart.

The image forming apparatus may further include a printing unit to print the calibration chart in response to a calibration request.

The printing unit may print a test sample to be used by a user to evaluate image quality of the test sample.

The image forming apparatus may further include a color value converting unit to convert the color values of the scanned calibration chart into brightness values to be used by the calibrating unit to calibrate the color printing values.

The foregoing and/or other features and utilities of the present general inventive concept may also be achieved by providing an apparatus to calibrate color printing values of an image forming apparatus, the apparatus including a calibration unit to receive image values form a calibration chart printed by the image forming apparatus, and to calibrate color printing values of the image forming apparatus according to the received image values, and a communication unit to transmit the calibrated color printing values to the image forming apparatus.

The apparatus may further include a color value converting unit to convert colors scanned from the calibration chart into brightness values, and to send those brightness values to the calibration unit as the image values.

The calibration unit may calibrate the color printing values according to a comparison between the received image values and the stored image values.

The calibration unit calibrates the color printing values used in a plurality of printing modes based upon the received image values.

The foregoing and/or other features and utilities of the present general inventive concept may also be achieved by providing a method of calibrating color printing values of an image forming apparatus, the method including receiving image values from a calibration chart printed by the image forming apparatus, and calibrating color printing values of the image forming apparatus according to a comparison between the received image values and stored image values.

The method may further include scanning the calibration chart to detect printed colors, and converting the printed colors into brightness values to be used as the received image values.

The method may further comprise transmitting the calibrated color printing values to the image forming apparatus.

The calibration of the color printing values may include calibrating a halftone table used in printing operations of the image forming apparatus.

The calibration of the color printing values may include calibrating a plurality of halftone tables respectively used in a plurality of printing modes of the image forming apparatus.

The foregoing and/or other features and utilities of the present general inventive concept may also be achieved by providing a computer readable medium having recorded thereon a program to cause a computer to perform a method of calibrating color printing values of an image forming apparatus, the method including receiving image values from a calibration chart printed by the image forming apparatus, and calibrating color printing values of the image forming apparatus according to a comparison between the received image values and stored image values.

BRIEF DESCRIPTION OF THE DRAWINGS

These and/or other features and advantages of the present general inventive concept will become apparent and more readily appreciated from the following description of the embodiments, taken in conjunction with the accompanying drawings of which.

DETAILED DESCRIPTION OF THE EMBODIMENTS

Figure 1:
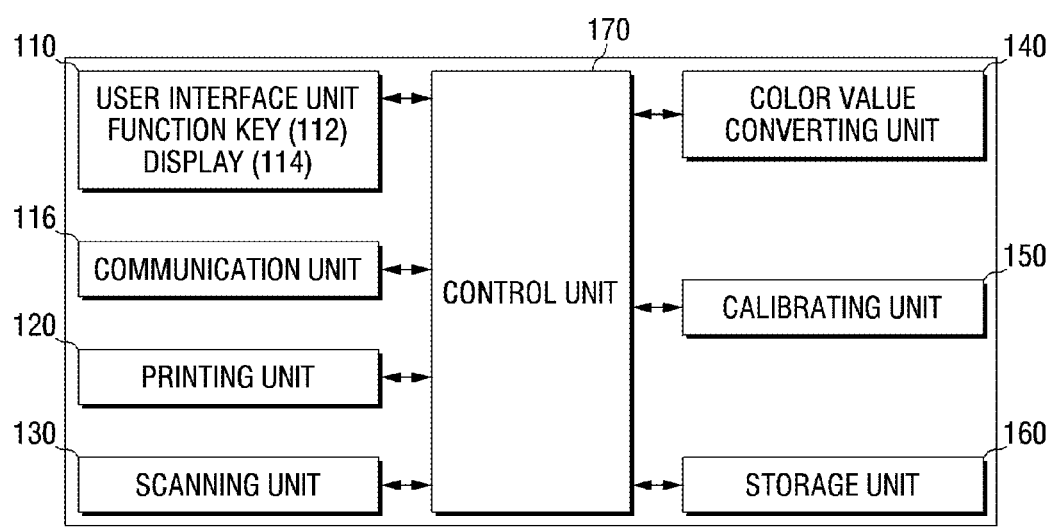
FIG. 1 illustrates a block diagram of an image forming apparatus according to an exemplary embodiment of the present general inventive concept.

Reference will now be made in detail to various exemplary embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a block diagram of an image forming apparatus 100 according to an exemplary embodiment of the present general inventive concept.

In FIG. 1, the image forming apparatus 100 may include a user interface unit 110, a communicating unit 116, a printing unit 120, a scanning unit 130, a color value converting unit 140, a calibrating unit 150, a storage unit 160, and a control unit 170.

The user interface unit 110 may support interfacing between the image forming apparatus 100 and a user. The user interface unit 110 may include a function key 112 to receive a predetermined request signal from a user, a display window 114 which may also function as a touch panel, and so on.

The function key 112 may be provided as a set of push buttons, pressure sensing buttons, heat sensing buttons, etc., or any combination thereof. Also, as stated above, the display window 114 may display a graphical user interface (GUI) which may be used in combination with or in place of the function key 112.

Additionally, the image forming apparatus 100 may receive various operational request signals from outside the image forming apparatus 100, such as from a host computer or server, through the communicating unit 116. The communicating unit 116 may also send signals from the control unit 170 to various devices outside of the image forming apparatus 100.

In the descriptions of the various exemplary embodiments discussed below, the user requests will normally be described as being entered by a user through the user interface unit 110. However, it is understood that any of the various incoming and/or outgoing requests/reports may also be communicated through the communicating unit 116.

For example, the user interface unit 110 may receive a calibration algorithm execution request signal or a calibration algorithm re-execution request signal from a user. If the user interface unit 110 includes the function key 112, the function key 112 may be a key used exclusively to input the calibration algorithm execution request signal or the calibration algorithm re-execution request signal. Additionally, if the user interface unit 110 includes a display window 114 in the form of a touch panel, a button to input the calibration algorithm execution request signal or the calibration algorithm re-execution request signal may be displayed on the display window 114.

The printing unit 120 may print predetermined data under the control of the control unit 170 that will be described below. The image forming apparatus 100 may perform printing in a plurality of resolution modes. Accordingly, the printing unit 120 may perform printing according to the plurality of resolution modes. Herein, the plurality of resolution modes may include, for example, a normal mode, a best mode, and a draft mode. In this exemplary embodiment of the present general inventive concept, the printing unit 120 may print a test sample or a calibration chart. In this situation, when no mode is set separately, the test sample or the calibration chart may be printed in the normal mode, because the normal mode is the most basic among the three modes. In other words, if no mode is separately set for the printing of the test sample or calibration chart, the control unit 170 may control the printing unit 120 to print the test sample or calibration chart in the normal mode as a default mode.

The scanning unit 130 may scan a predetermined document under the control of the control unit 170 and input color values of the scanned document. The input color values may be, for example, RGB (red, green, and blue) values. In this situation, the scanning unit 130 may perform scanning at 300 dots per inch (DPI). In this exemplary embodiment of the present general inventive concept, the scanning unit 130 may scan the calibration chart printed by the printing unit 120 and input RGB values of the scanned calibration chart.

The color value converting unit 140 may convert the RGB values of the scanned calibration chart into brightness values, for example Y values in YCbCr color coordinate. In the YCbCr color coordinate, Y represents the luma component, Cb represents the blue-difference chroma component, and Cr represents the red-difference chroma component.

The calibrating unit 150 may calibrate an image according to the plurality of resolution modes using the brightness values converted by the color value converting unit 140. The calibrating unit 150 may calibrate halftone tables set to be respectively used in each of the plurality of resolution modes, and may then calibrate an image. In more detail, the calibrating unit 150 may compare the brightness values to preset reference values of the halftone tables set to be respectively used in each of the plurality of resolution modes, may set calibration values, and may apply each of the set calibration values to the halftone tables set to be respectively used in each of the plurality of resolution modes, so as to calibrate the halftone tables.

In this exemplary embodiment of the present general inventive concept, the calibrating unit 150 may calibrate halftone tables of resolution modes other than the normal mode based on the printing result of the calibration chart printed in the normal mode. In other words, the calibrating unit 150 may calibrate halftone tables of the best and draft modes based on the printing result of the calibration chart printed in the normal mode. Accordingly, it is possible to reduce the time required to execute the calibration algorithm, and to save consumables such as printing sheets compared to a case in which the printing unit 120 prints a calibration chart according to each of the plurality of resolution modes.

The storage unit 160 may store a variety of information used to perform various operations of the image forming apparatus 100. In this exemplary embodiment of the present general inventive concept, the storage unit 160 may store halftone tables set to be respectively used in each of the plurality of resolution modes, and a reference value of the halftone tables set to be respectively used in each of the plurality of resolution modes. Additionally, the storage unit 160 may store the calibration chart and the test sample.

The reference value of each halftone table stored in the storage unit 160 may be obtained through a process of printing the calibration chart when a consumable has not yet been used in manufacture of the image forming apparatus 100. Alternatively, the reference value of each stored halftone table may be obtained by printing the calibration chart in one of the first operations of the image forming apparatus 100, before there has been any significant use of the consumable portion(s) of the image forming apparatus 100.

The control unit 170 may control the overall operations of the image forming apparatus 100. In more detail, the control unit 170 may control signal input and output among the user interface unit 110 and/or communicating unit 116, the printing unit 120, the scanning unit 130, the color value converting unit 140, the calibrating unit 150, and the storage unit 160.

After the calibration algorithm execution request signal is received via the user interface unit 110 or the communicating unit 116, the control unit 170 may control the printing unit 120 to print the test sample. Additionally, after the calibration algorithm re-execution request signal is received via the user interface unit 110 or the communicating unit 116, the control unit 170 may control the printing unit 120 to print the calibration chart.

Figure 2:
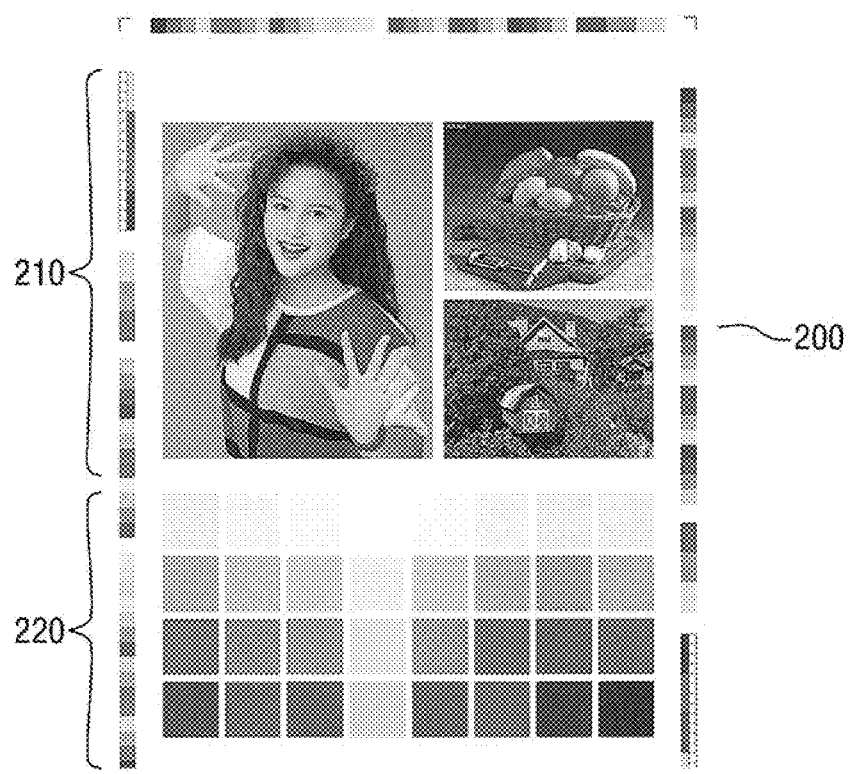
FIG. 2 illustrates a test sample according to an exemplary embodiment of the present general inventive concept.

FIG. 2 exemplarily illustrates a test sample 200 according to an exemplary embodiment of the present general inventive concept.

The test sample 200 of FIG. 2 may be used to check the printing status of the image forming apparatus 100. The test sample 200 may include one or more images 210, a color bar 220 having a plurality of color gradations, or a combination thereof. To check the printing status of the image forming apparatus 100 more efficiently, the one or more images 210 may be formed with various colors.

The test sample 200 illustrated in FIG. 2 is merely an example of a test sample to check the printing status of the image forming apparatus 100, and it is understood that there is no limitation to the form or content of the test sample 200. Accordingly, the present general inventive concept is also applicable to any form which facilitates checking the printing status of the image forming apparatus 100.

The test sample 200 may be stored in the storage unit 160. The test sample 200 may be printed by the printing unit 120 in response to the calibration algorithm execution request signal received via the user interface unit 110 or the communicating unit 116. Additionally, after each halftone table has been completely calibrated according to the plurality of resolution modes, the test sample 200 may be printed again by the printing unit 120 in order to determine whether or not calibration of each halftone table is fully performed.

Figure 3:
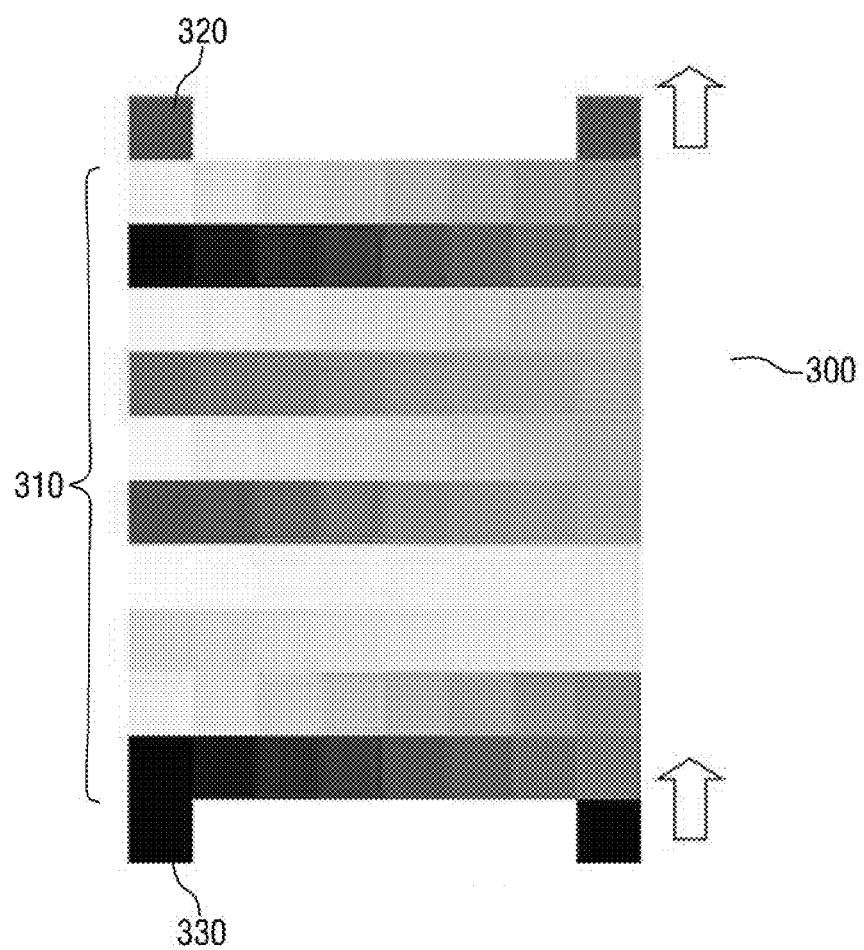
FIG. 3 illustrates a calibration chart according to an exemplary embodiment of the present general inventive concept.

FIG. 3 exemplarily illustrates a calibration chart 300 according to an exemplary embodiment of the present general inventive concept.

The calibration chart 300 illustrated in FIG. 3 may be used to set calibration values when image calibration is determined to be required as a result of printing the test sample 200.

The calibration chart 300 may include a color bar 310 in which primary colors such as cyan (C), magenta (M), yellow (Y) and black (K), are gradually gradating from their original colors to white in 16 steps. It is understood that the number of gradations is not limited to the number used in this exemplary embodiment. Any number of gradations which are sufficient to set calibration values may be used, and different numbers of gradations may be used for different colors C, M, Y, and K.

Letter size (8½×11 inches) sheets of paper are typically used in the image forming apparatus 100, so the calibration chart 300 may be configured with two lines for each color. Each of the two lines may include a color bar with colors gradated in 8 levels, so that the total color gradations from both rows is 16 for each color. The calibration chart 300 may further include a top point 320 and a bottom point 330 using different colors in order to distinguish the top and bottom of the calibration chart 300 printed by the printing unit 120.

After the calibration algorithm re-execution request signal is received via the user interface unit 110 or the communicating unit 116, the calibration chart 300 of FIG. 3 may be printed by the printing unit 120, may be scanned by the scanning unit 130, and may then be used in the calibration algorithm.

Figure 4:
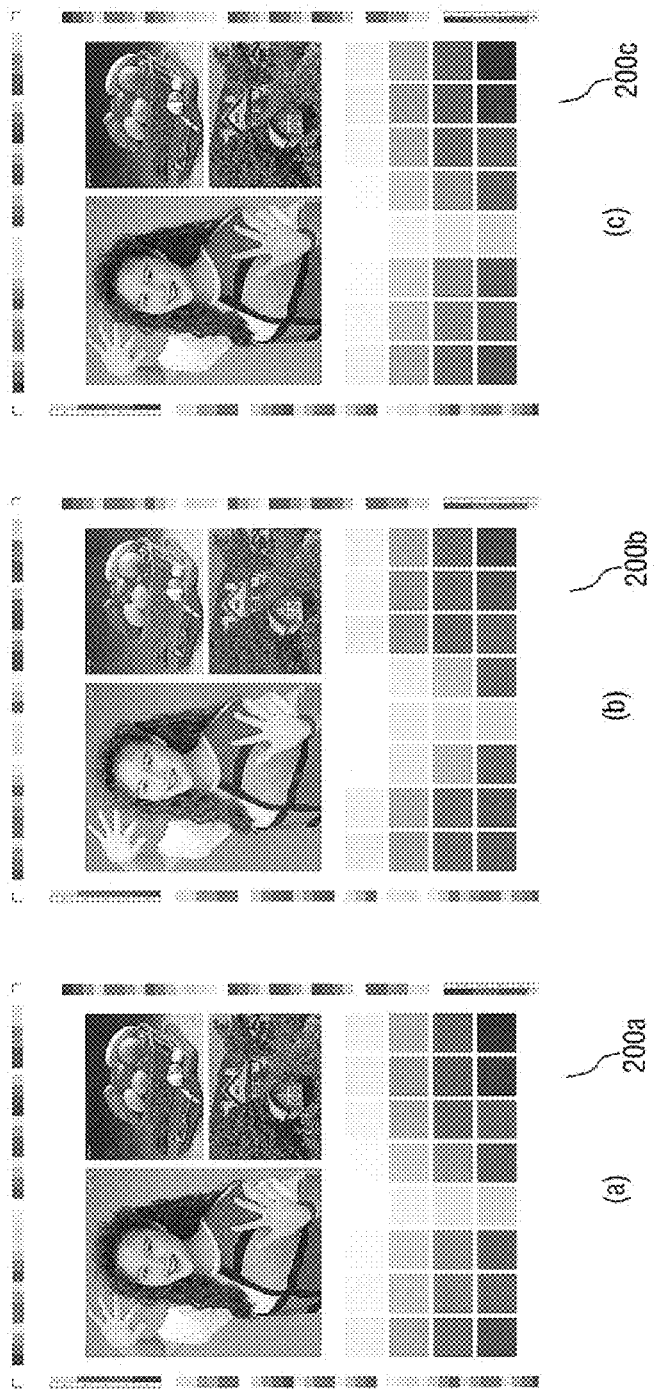
FIG. 4 illustrates a printing status of a test sample according to an exemplary embodiment of the present general inventive concept.

FIG. 4 exemplarily illustrates the printing status of a test sample according to an exemplary embodiment of the present general inventive concept.

In FIG. 4, three prints 200a, 200b, 200c are obtained after the test sample 200 of FIG. 2 is printed by the printing unit 120. In more detail, the first print 200a may be obtained after printing the test sample 200 when a consumable of the image forming apparatus 100 has not yet been used, the second print 200b may be obtained after printing the test sample 200 when the image quality is deteriorated due to use of the image forming apparatus 100, and the third print 200c may be obtained after printing the test sample 200 after the calibrating unit 150 executes the calibration algorithm.

As illustrated in FIG. 4, the image quality of the first print 200a is normal, but the image quality of the second print 200b is not normal due to deterioration such as that caused by use and consumption of one or more consumables in the image forming apparatus 100. If the second print 200b is obtained after printing the test sample 200, the printing unit 120 may print the calibration chart 300 and the calibrating unit 150 may then execute the calibration algorithm, so as to obtain the third print 200c with the same image quality as the first print 200a.

In other words, if the printing of the second print 200b shows deterioration in comparison with the image quality of the first print 200a, the printing unit 120 may be requested to print the calibration chart 300. The calibration chart 300 may then be scanned by the scanning unit 300, and the color value converting unit 140 may convert the color values of the scanned calibration chart into brightness values which are used by the calibrating unit 150 to set calibration valued and calibrate a halftone table set for each resolution mode. The printing unit 120 may then be requested to print the third print 200c, which will ideally have the same image quality as the first print 200a.

Figure 5:
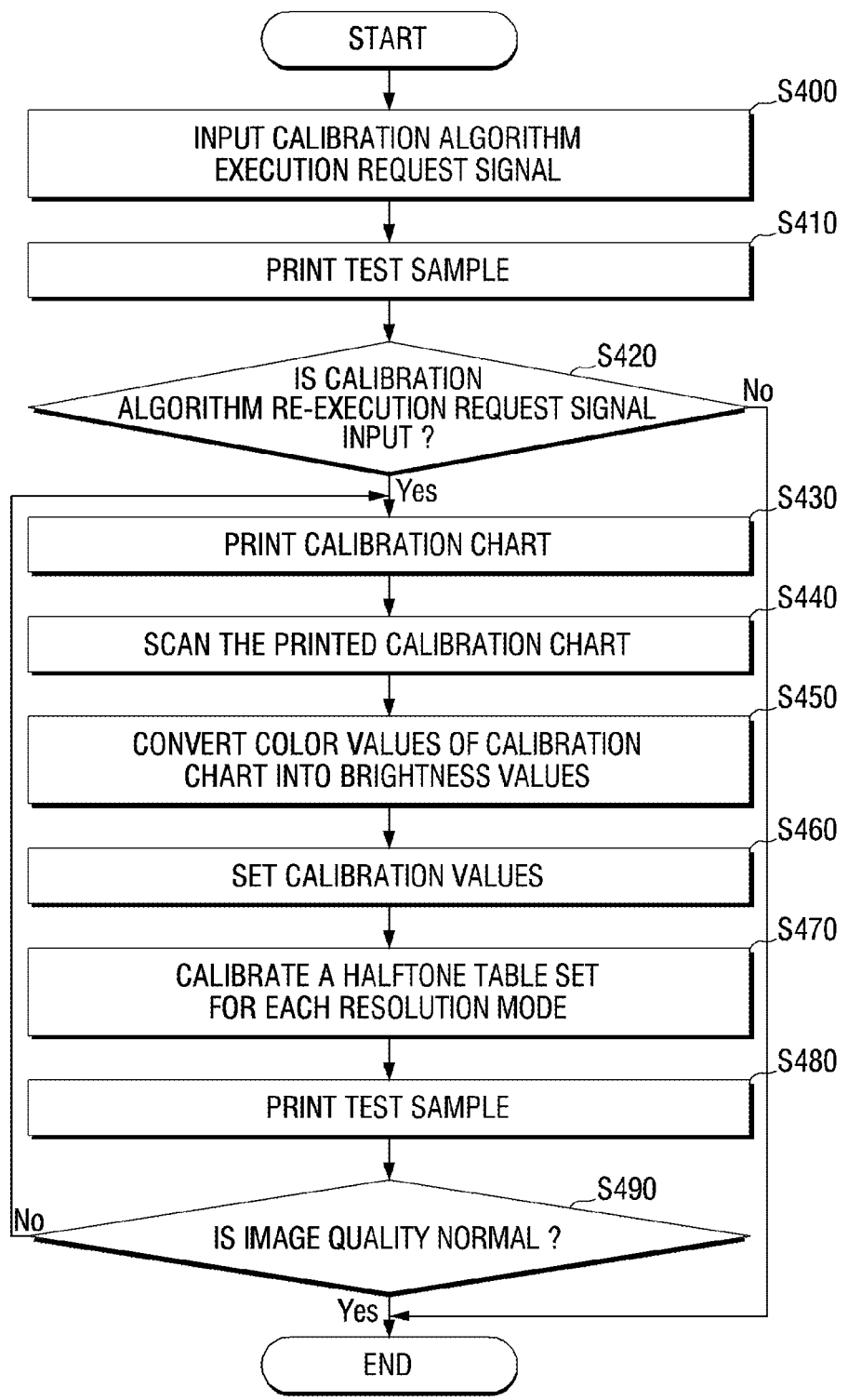
FIG. 5 is a flowchart illustrating an image quality calibration method of an image forming apparatus according to an exemplary embodiment of the present general inventive concept.

FIG. 5 is a flowchart illustrating an image quality calibration method of an image forming apparatus according to an exemplary embodiment of the present general inventive concept.

When the image forming apparatus 100 performs a printing operation, if the print quality is not constant, a user may input the calibration algorithm execution request signal using the user interface unit 110 in operation S400. Alternatively, the calibration algorithm execution request signal may be received from a host computer, server, or the like through the communicating unit 116.

In response to the calibration algorithm execution request signal, the control unit 170 may control the printing unit 120 to print the test sample 200 in operation S410. The test sample 200 may be stored in the storage unit 160, in the host computer or server which sends the calibration algorithm execution request signal, or another storage device which communicates with the image forming apparatus 100.

After the test sample 200 is printed, the user may determine whether or not the image quality of the test sample 200 is normal by checking the test sample 200. In this situation, if it is determined that the image quality of the test sample 200 is not normal, the user may input the calibration algorithm re-execution request signal using the user interface unit 110 in operation S420. Again, the calibration algorithm re-execution request signal may be received from a host computer or the like through the communicating unit 116.

In response to the calibration algorithm re-execution request signal in operation S420-Y, the control unit 170 may control the printing unit 120 to print the calibration chart 300 stored in the storage unit 160 in operation S430. Alternatively, the calibration chart 300 may be stored in the host computer or server which sends the calibration algorithm re-execution request signal, or another storage device which communicates with the image forming apparatus 100.

After the printing unit 120 prints the calibration chart 300 under the control of the control unit 170, the scanning unit 130 may scan the printed calibration chart 300, and may input color values of the scanned calibration chart 300, namely RGB values, in operation S440.

The color value converting unit 140 may convert the RGB values input by the scanning unit 130 into brightness values, for example Y values, in operation S450.

The calibrating unit 150 may receive the brightness values from the color value converting unit 140, and may compare the received brightness values to the reference value of each halftone table which may be pre-stored in the storage unit 160, and may set calibration values in operation S460. The reference value of the halftone tables may also be stored outside of the image forming apparatus 100 in a storage device that communicates with the image forming apparatus 100.

After setting the calibration values, the calibrating unit 150 may calibrate a halftone table set for each of the plurality of resolution modes which is stored in the storage unit 160 in operation S470.

Subsequently, the control unit 170 may control the printing unit 120 to print the test sample 200 stored in the storage unit 160 in operation S480.

After the test sample 200 is printed by the printing unit 120, the user may determine whether or not the image quality of the prints is normal in operation S490. If the user determines that the image quality of the prints is normal in operation S490, the image quality calibration method may be terminated. If the user determines that the image quality of the prints is not normal in operation S490, the image quality calibration method may be repeated from operation 430.

Figure 6:
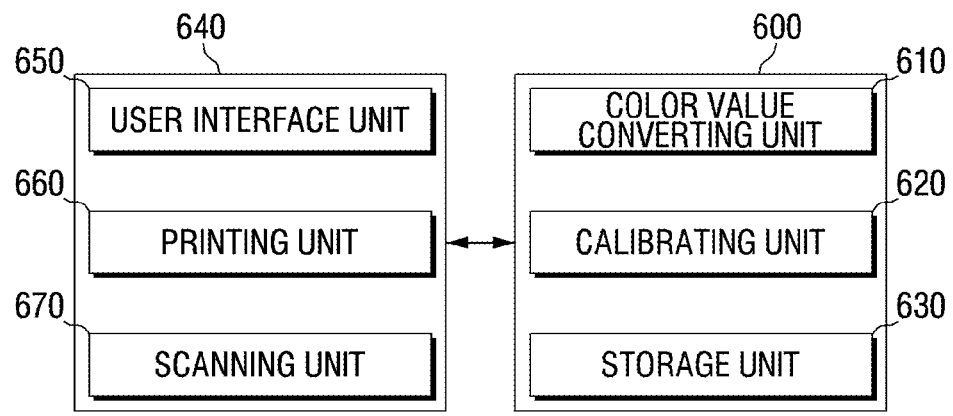
FIG. 6 illustrates a block diagram of a host computer connected to an image forming apparatus according to an exemplary embodiment of the present general inventive concept.

In another alternative embodiment of the present general inventive concept, calibration operations may be performed in a host computer communicating with an image forming apparatus. FIG. 6 illustrates a block diagram of a host computer connected to an image forming apparatus according to an exemplary embodiment of the present general inventive concept.

The host computer 600 of FIG. 6 communicates with the image forming apparatus 640 to perform the previously discussed calibration operations. The host computer 600 may include a color value converting unit 610, a calibrating unit 620, and a storage unit 630. The image forming apparatus 640 may include a user interface unit 650, a printing unit 660, and a scanning unit 670.

The color value converting unit 610 may receive RGB values from the scanning unit 670 after a scanning of the calibration chart 300, and may convert the RGB values input by the scanning unit 670 into brightness values. The calibrating unit 620 may receive the brightness values from the color value converting unit 610, and may compare the received brightness values to the reference value of each halftone table which may be pre-stored in the storage unit 630, and may set the calibration values.

After setting the calibration values, the calibrating unit 620 may calibrate a halftone table set for each of the plurality of resolution modes which is stored in the storage unit 630, and the host computer 600 may communicate the calibrated halftone tables to the image forming apparatus 640. In this manner, the host computer 600 may perform the calibration operations for a plurality of image forming apparatuses, such that color value converting units and calibrating units are not required to be provided in each of the image forming apparatuses.

The calibration performed by the host computer 600 may be performed in response to an input calibration algorithm re-execution request signal which may be input through the user interface unit 650, or may be input at the host computer 600.

As described above, it is possible to calibrate the image quality of the image forming apparatus 100 so that current printed samples have similar image quality as that of prints during initial use of a consumable.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various exemplary embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. An image forming apparatus with a plurality of resolution modes including a first resolution mode associated with a first halftone table and a second resolution mode associated with a second halftone table, the apparatus comprising:
   a printing unit to print a calibration chart on a single sheet of paper in one of the plurality of resolution modes;
   a scanning unit to scan the calibration chart printed on the single sheet of paper;
   a calibrating unit to calibrate the first halftone table and the second halftone table using color values obtained by scanning the calibration chart printed on the single sheet of paper,
   a user interface unit to receive input of a calibration algorithm execution request signal; and
   a control unit to control the printing unit to print a test sample in response to the request signal being received via the user interface unit,
   wherein the user interface unit receives input of a calibration algorithm re-execution request signal according to a printing status of the printed test sample.

2. The apparatus according to claim 1, wherein the plurality of resolution modes comprise a normal mode, a best mode, and a draft mode.

3. The apparatus according to claim 1, further comprising:
   a color value converting unit to convert the color values of the scanned calibration chart into brightness values;
   wherein the calibrating unit calibrates the halftone tables set to be respectively used in each of the plurality of resolution modes using the converted brightness values.

4. The apparatus according to claim 3, wherein the calibrating unit compares the converted brightness values to preset reference values of the halftone tables set to be respectively used in each of the plurality of resolution modes, sets calibration values, and applies each of the set calibration values to the halftone tables set to be respectively used in each of the plurality of resolution modes.

5. The apparatus according to claim 1, wherein the printing unit prints a test sample using the calibrated halftone tables set to be respectively used in each of the plurality of resolution modes.

6. The apparatus according to claim 1, wherein the calibration chart comprises a chart in which cyan (C), magenta (M), yellow (Y) and black (K) are gradually gradated from their respective original colors to white in 16 grades.

7. An image quality calibration method used in an image forming apparatus with a plurality of resolution modes including a first resolution mode associated with a first halftone table and a second resolution mode associated with a second halftone table, the method comprising:
   printing a calibration chart on a single sheet of paper in one of the plurality of resolution modes;
   scanning the calibration chart printed on the single sheet of paper; and
   calibrating the first halftone table and the second halftone table using color values obtained by scanning the calibration chart printed on the single sheet of paper; and
   printing a test sample using the calibrated halftone tables set to be respectively used in each of the plurality of resolution modes.

8. The method according to claim 7, wherein the plurality of resolution modes comprise a normal mode, a best mode and a draft mode.

9. The method according to claim 7, further comprising:
converting the color values of the scanned calibration chart into brightness values,
wherein the calibrating of the image includes calibrating the halftone tables set to be respectively used in each of the plurality of resolution modes using the converted brightness values.

10. The method according to claim 9, wherein the calibrating of the image comprises:
comparing the converted brightness values to preset reference values of the halftone tables set to be respectively used in each of the plurality of resolution modes;
setting calibration values; and
applying each of the set calibration values to the halftone tables set to be respectively used in each of the plurality of resolution modes.

11. The method according to claim 5, further comprising:
receiving input of a calibration algorithm execution request signal; printing a test sample in response to the request signal being received via the user interface unit; and receiving input of a calibration algorithm re-execution request signal according to a printing status of the printed test sample.

12. The method according to claim 5, wherein the calibration chart comprises a chart in which cyan (C), magenta (M), yellow (Y) and black (K) are gradually gradated from their respective original colors to white in 16 grades.

13. An image forming apparatus having a plurality of resolution modes including a first resolution mode and a second resolution mode, the image forming apparatus comprising:
a printing unit to print a calibration chart on a single sheet of paper in one of the plurality of resolution modes;
a scanning unit to scan the calibration chart printed on the single sheet of paper; and
a calibration unit to perform calibration for the first resolution mode and the second resolution mode based on color values obtained by scanning the calibration chart printed on the single sheet of paper, wherein the first resolution mode is associated with a first halftone table and the second resolution mode is associated with a second halftone resolution table, the calibration unit performing calibration for the first resolution mode and the second resolution mode by respectively calibrating the first halftone table and the second halftone table using color values obtained by scanning the calibration chart printed on the single sheet of paper; and
printing a test sample using the calibrated first and second halftone tables set to be respectively used in the first and second resolution modes.

14. The image forming apparatus of claim 13, further comprising:
a color value converting unit to convert colors scanned from the calibration chart into brightness values, and to send those brightness values to the calibration unit as the image values.

15. The image forming apparatus of claim 13, wherein the calibration unit calibrates the color printing values according to a comparison between the received image values and stored image values.

16. The image forming apparatus of claim 13, wherein the calibration unit calibrates the color printing values used in a plurality of printing modes based upon the received image values.

* * * * *